April 8, 1958 E. H. T. BENSEMANN 2,829,373
MEANS FOR COMBINATION WITH A NAILING MACHINE
IN SECURING THE LIDS OF FRUIT AND LIKE CASES
Filed July 27, 1955 4 Sheets-Sheet 1

INVENTOR
E. H. T. BENSEMANN
By Young, Emery & Thompson
ATTYS.

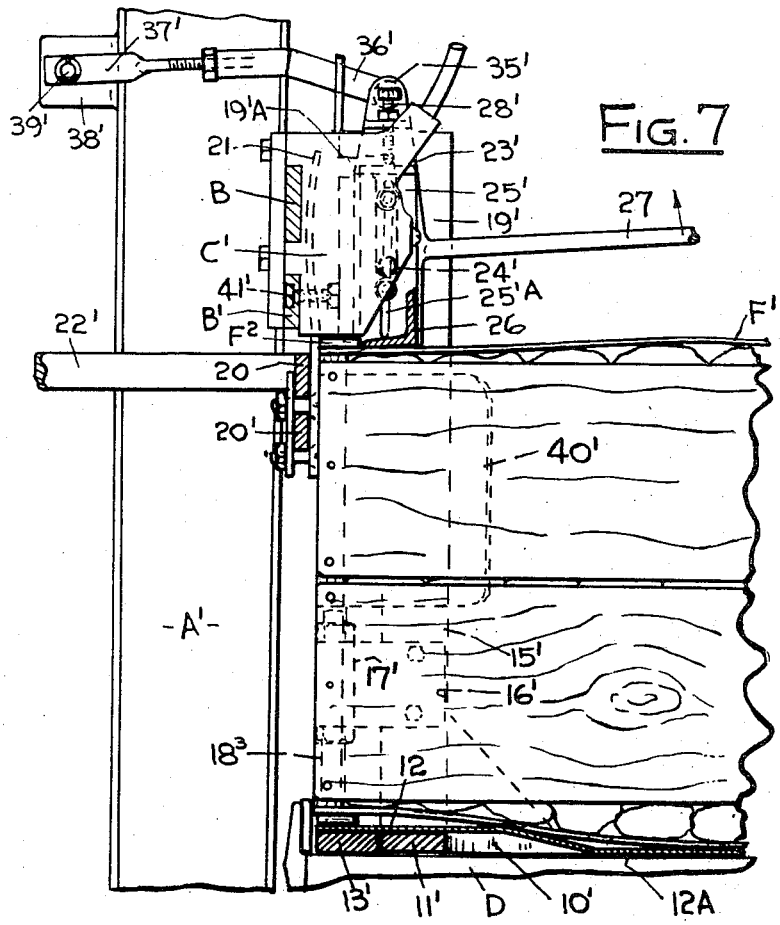
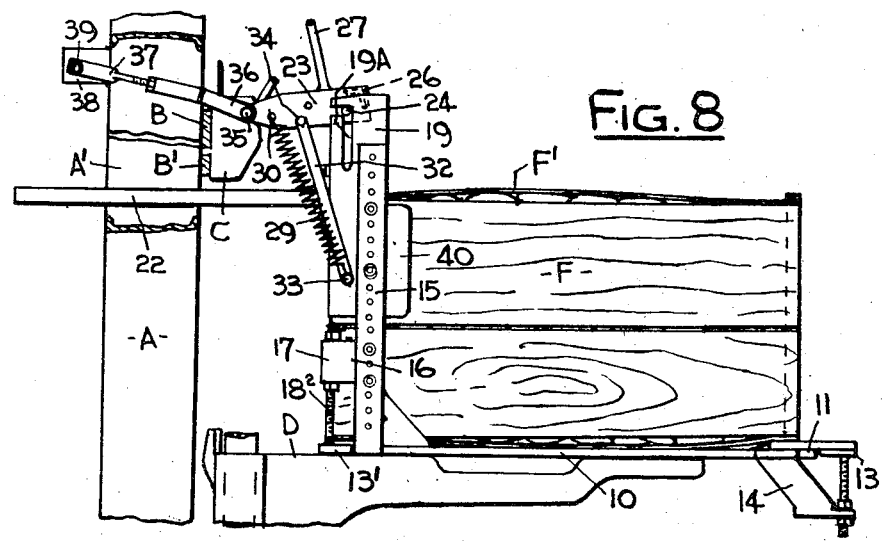

United States Patent Office 2,829,373
Patented Apr. 8, 1958

2,829,373

MEANS FOR COMBINATION WITH A NAILING MACHINE IN SECURING THE LIDS OF FRUIT AND LIKE CASES

Edward Hans Tui Bensemann, Wellington, New Zealand, assignor to N. Z. Inventions Development Company Limited, Wellington, New Zealand, a company of New Zealand Application July 27, 1955, Serial No. 524,678

5 Claims. (Cl. 1—134)

This invention relates to a lidding press that has been devised for use with a nailing machine in securing the lids of vegetable cases, and more especially fruit cases.

Cases for holding fruit are made of light wooden slats with substantial ends to which the slats are fastened, usually with cross cleats. The case is filled with fruit sufficiently to cause the lighter lid and floor to bulge outwards when the lid is placed in position to close the case. This practice is necessary when packing fruit such as apples, owing to the tendency of the fruit to shrink during cold storage.

Nailing machines for making up the cases each have inter alia a main frame with a number of nailing guns arranged to depend across the front of the frame and a case assembling and supporting table disposed a distance below the guns to extend out forwardly of the main frame.

It is a primary object of this invention to provide a lidding press for use with such a nailing machine whereby a filled case with the lid parts positioned thereon may have an end of its lid parts compressed in a certain action and be clamped, such end being readily placed and nailed, and then removed.

According hereto, the invention broadly covers a lidding press for use with a nailing machine having a work table and nailing guns disposed over the table, such means comprising a case-mounting base adapted to be movably mounted on the table for positioning an end of a case mounted on the base beneath the guns and a press or clamping member articulated to the base adapted to force the end of the lid down on to the case body when the case is in position.

Figure 1:
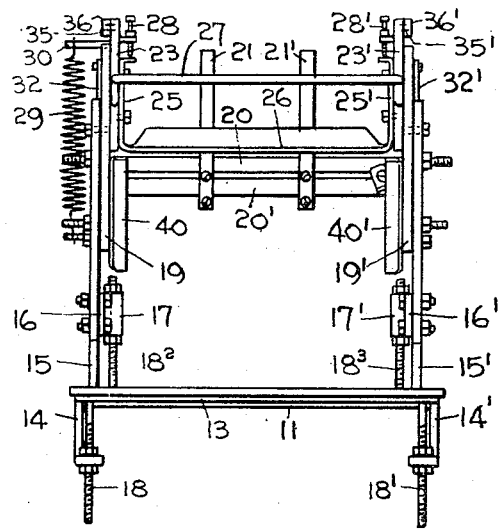
Figure 2:
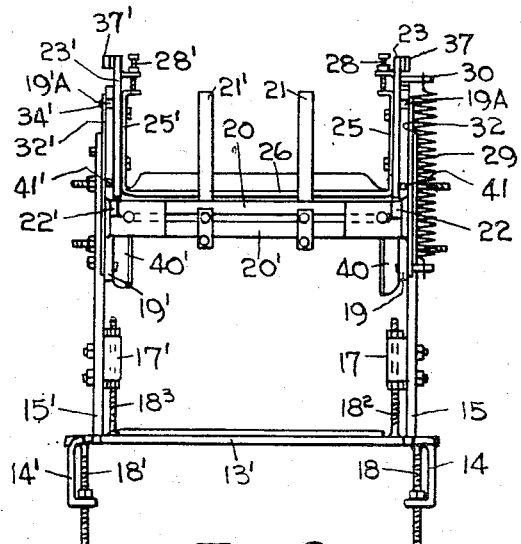
Figure 3:
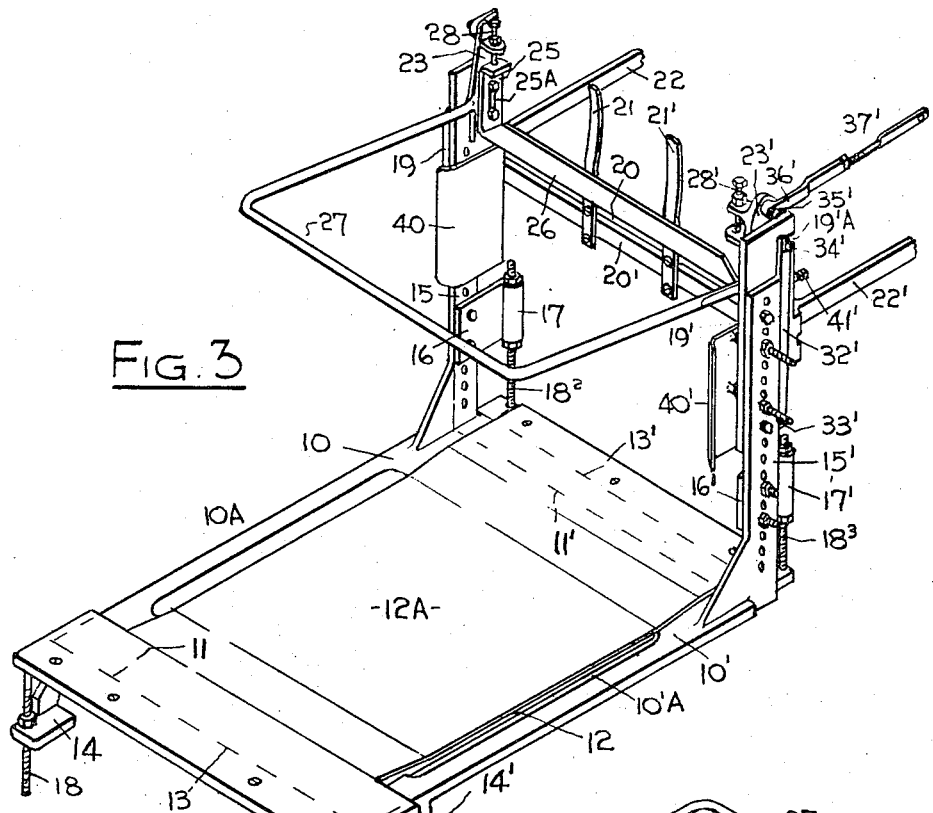
Figure 4:
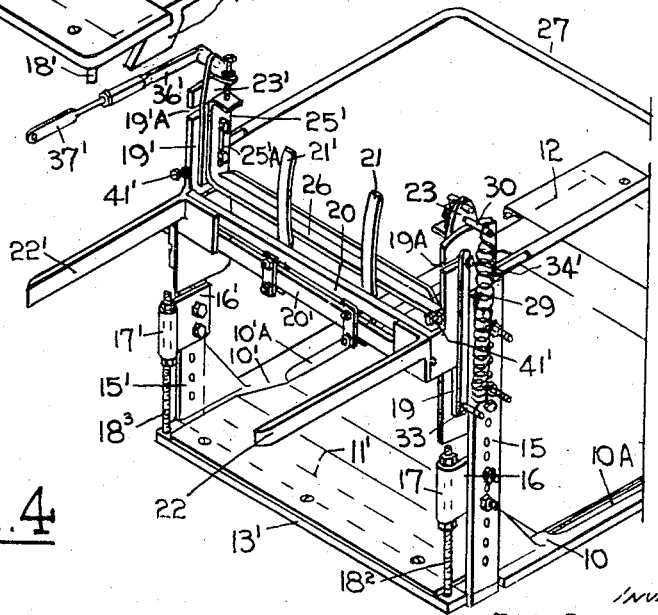
Figure 5:
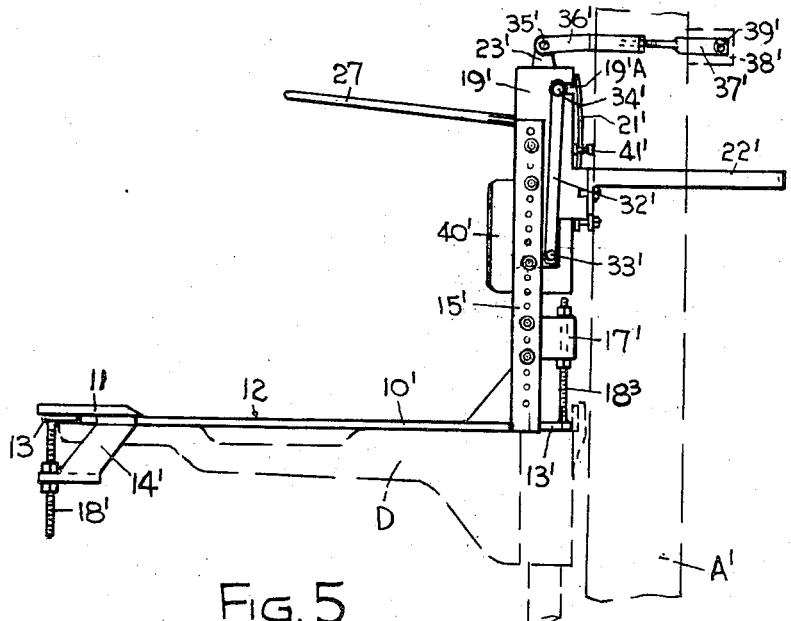
Figure 6:
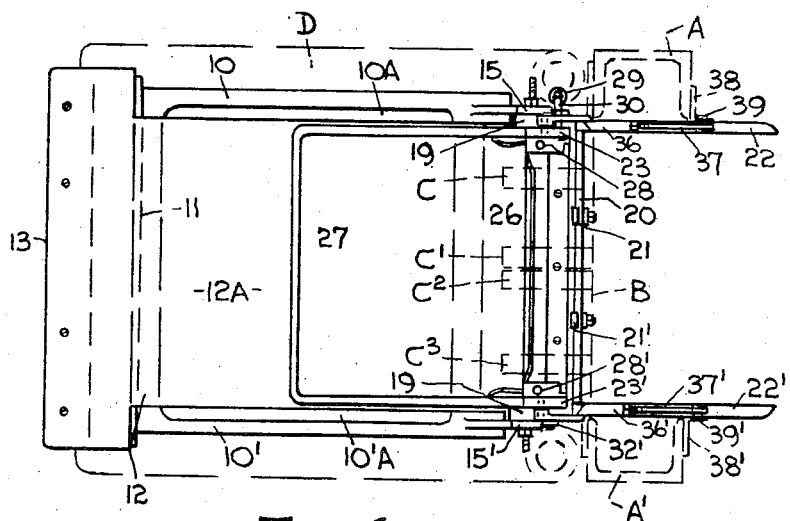

In more fully describing the invention reference will hereinafter be made to the accompanying drawings, in which:

Figure 1 is a front view;
Figure 2 is a back view;
Figure 3 is a frontal perspective view with rear parts thereof shown broken;
Figure 4 is a partial rearward perspective view;
Figure 5 is a right hand side view;
Figure 6 is a plan of the lidding press mounted on part of the nailing machine which is represented by phantom outline;
Figure 7 is a sectional side detail view at the inner end of the press and the relevant part of the nailing machine, and the inner end of the case with its lid end clamped down, and
Figure 8 is a left hand side view showing the press in an inoperative position and freed.

The relevant portion of the nailing machine is included in drawing Figures 5–8; such portion includes vertical main frame standards A, A$^1$, with cross bars B, B$^1$, fitted to extend between the standards, a number of nailing guns C, C$^1$, C$^2$, C$^3$, arranged to depend from the cross bars, and a work table D disposed below the guns to extend out forwardly of the main frame standards A, A$^1$, on which it is slidably supported.

The lidding press according to the invention includes a base in which flat side rails or members 10, 10$^1$, are positioned greater than a case width apart, and flat members 11, 11$^1$, extend between the ends of the side members 10, 10$^1$, to make up a rigid flat frame; this frame is adapted to be movably mounted on the top surface of the work table D. The base further includes a platform or tray 12 of a required width to fit within the frame and of a length to lay over the end members 11, 11$^1$, of such frame. The ends of the tray 12 are attached to cross stiffeners 13, 13$^1$, the rear end being of similar length to the rear member 11$^1$ and the front one slightly longer; combined with the stiffeners are means whereby the tray is adjustably mounted to the frame.

Such means include brackets 14, 14$^1$, positioned near the front corners of the frame, each bracket having a ledge provided with a hole. At the back corners of the frame uprights 15, 15$^1$, extend vertically to above a case height and each is provided with a series of spaced apart holes centrally along its length, and plates 16, 16$^1$, are adjustably mounted to the uprights 15, 15$^1$, by bolts passing through selected holes. These plates 16, 16$^1$, have rear bosses 17, 17$^1$, through each of which a hole is formed vertically. The tray end stiffeners 13, 13$^1$, are provided with pairs of screws 18, 18$^1$, and 18$^2$, 18$^3$, fixed to project vertically from near the corners; the front screws 18, 18$^1$, are passed through the holes of the brackets 14, 14$^1$, and the back screws 18$^2$, 18$^3$, are passed through the holes of the bearing plates 16, 16$^1$. By screwing nuts on these screws the height of the tray 12 upon the base frame is regulated. The central area of the tray is shaped with a depression 12A fitting into the frame, and the aligning edges of the side members 10, 10$^1$, are bevelled as at 10A, 10$^1$A. The depression 12A in the tray will provide higher ends in the surface of the tray so that a fruit-filled case F positioned thereon will have any longitudinal bulge caused in solid packing of the fruit in the case to be accommodated by the depression, as shown in drawing Figure 7.

Combining with the uprights 15, 15$^1$, to provide a back-forming frame are extension members 19, 19$^1$, which are also formed with a series of spaced holes along its length, and by means of bolts passing through selected holes in the uprights 15, 15$^1$, and their extension members 19, 19$^1$, the latter are located and fixed at an adjusted height in relation to the base. The extension members are shaped with right-angled slots 19A, 19$^1$A, the lateral branches of the slots extending in from the plate's rear vertical edges and the slot's main part extending down vertically from the branches.

Extending between the bottom ends of the extension members 19, 19$^1$, is a cross structure consisting of two closely spaced apart bars 20, 20$^1$, fixed rigidly thereto and upon these bars are two brackets or arms 21, 21$^1$, that curve upwardly to a height at the rear of the base. These arms 21, 21$^1$, are adjustably mounted upon the bars 20, 20$^1$, so that the arms extend in vertical alignment for their top ends to be disposed at a height above the upper edge of the case F placed on the base tray 12. At the ends of the cross bars 20, 20$^1$, guide bars 22, 22$^1$, extend rearwardly; these bars 22, 22$^1$, are disposed a distance apart in relation to each other whereby they can act as guides or rails running against the inner face of the main standards A, A$^1$, of the nailing machine's main frame.

Mounted at the top of the upright's extension members 19, 19$^1$, are bearing plates 23, 23$^1$, having pins 24, 24$^1$ (see drawing Figures 7 and 8) projecting from their adjacent surfaces to be disposed to run in the angled slots 19A, 19$^1$A, of the extension members. Associated with the bearing plates 23, 23$^1$, are end or mounting plates 25, 25$^1$, of a clamping member 26; these mounting plates, which are arranged alongside the bearing plates, are secured thereto by bolts passing through vertical slots 25A, 25¹A, in the mounting plates 25, 25¹, for adjustment of the clamping member 26. This clamping member 26 is of an angular sectional shape with its ends or plates 25, 25¹, secured to the plates 23, 23¹, its main length being disposed to face outwards in relation to the ends, of the base. Fixed to project from the bearing plates 23, 23¹, a handle 27 extends at a requisite angle so that it is beyond the clamping member 26. Such handle member 27 is also of U or a bow shape and its ends are fixed to the bearing plates as described above. The angle at which it is set is preferably at substantially a right angle so that the handle's bow is always above and beyond the centre of the clamping member 26. Stops are mounted at the inner sides of the bearing plates 23, 23¹, to act against the mounting plates 25, 25¹, for adjusting the downward positioning of the clamping member 26. The stops are in the nature of adjusting screws 28, 28¹, passing through lugs on the bearing plates 23, 23¹, and lock nuts for engaging at their inner ends the tops of the mounting plates 23, 23¹. A spring 29 is set in tension between a stud 30 of the extension member 19 beyond its pivot pin 24, 24¹, and a part at a lower point on the extension member.

Combining with the bearing plates 23, 23¹, of the clamping member 26 and its handle 27 are lever mechanisms actuating such member, and acting also as a stop in relation to certain positions of the clamping member and certain travel movements of the base. The mechanisms comprise radius links 32, 32¹, extending vertically, with their lower ends pivoted as at 33, 33¹, in the extension members 19, 19¹, at a distance below their angled slots 19A, 19¹A, and the links' other and upper ends pivoted on pins 34, 34¹, at points beyond the pins 31, 31¹ in the bearing plates 23, 23¹, which points are each on a radius similar to that of the pins 24, 24¹, so that the pins 34, 34¹, enter the branches of the slots 19A, 19¹A. The outer ends of the bearing plates 23, 23¹, are pivoted as at 35, 35¹, to control links 36, 36¹. These control links are disposed to extend substantially horizontally rearward within the machine and at their back are connected to the machine so that there is a back stop for the movable base through the links' back ends provided with the clevis 37, 37¹, so as to be adjustably engaged upon rear fixtures 38, 38¹, on the back of the main standards A, A¹, and be removably locked thereto by suitable keepers or bolts 39, 39¹. These also serve to act as positive stops for locking or limiting the base at the end of its forward or outward travel on the work table D, as shortly described. With the links 32, 32¹, medially pivoted in bearing plates 23, 23¹, and the plate's guide pins 24, 24¹, disposed to run in the angle slots 19A, 19¹A, of the extension members 19, 19¹, a compound leverage system is provided for the clamping member 26 in its downward operative movement.

In its combination with the nailing machine the lidding press is positioned so that the arms 21, 21¹, of the back frame are adapted to fit in spaces between the adjustable nailing guns C, C¹, C², C³, at the front of the crossbars B, B¹, of the machine's main frame, and its base members 10, 10¹, are movably mounted upon the machine's work table D. Also in this fitment the control links have their clevis 37, 37¹, pivoted on the bolts 39, 39¹ as previously mentioned.

In the application of the lidding press and its combination with the nailing machine, a case F slightly overfilled with fruit and with its lid portions, i. e. at least one of the slat lengths F¹ and preferably a cleat F² at an end, is positioned lengthwise on the base tray 12 so that a bulging floor of the case is accommodated in the depression 12A of the tray. Also, this placing of the case F is aided and its end self-centred by curved plates 40, 40¹, on the uprights 15, 15¹, or their extensions 19, 19¹, of the back frame. The case end is thus positioned between the uprights 15, 15¹, and rests up against the front face of the horizontal cross bars 20, 20¹, of the back frame and the front curving faces of the back's arms 21, 21¹, serve as guides for the end edge of the lid slats F¹ as they move down to the case and fit in between the made spaces of the machine's adjustable nailing guns.

The machine operator now throws down the handle member 27 and this results in a bar in the clamping member 26 turning down through the attached plates 23, 23¹, and 25, 25¹, which, by a pivotal action of the radius links 32, 32¹, to compress the lid, also causes the pivotal connections of the plates 23, 23¹, with their control links 36, 36¹, to over-centre and apply a pulling pressure through the control links to the fixtures 38, 38¹, at the rear of the machine standards A, A¹. This causes the base with the case thereon to move rearwards or inwards of the machine's work table D.

Simultaneously, through the guide pins 24, 24¹, moving down the slots 19A, 19¹A, in the extension members 19, 19¹, the bar of the clamping member 26 is given a substantially downward vertical movement with the links 32, 32¹, pivoting upon the upright's members 19, 19¹, and the plates 23, 23¹, and 25, 25¹, to allow necessary limited radial movement.

Thus the central clamping member 26, through a small arc of movement, comes down to contact the lid portions at a terminating end locality in its curving length or bulge and with increasing pressure to compact down the fruit until the clamping member reaches a slight predetermined distance or margin from the edge of that end of the case. The end is now clamped solidly in its fixed position in the back frame. Thus as soon as the operator threw the handle 27 to apply clamping, the base and the case thereon started to move, a singular and fast movement. Stop screws 41, 41¹, in the back edge of the extension members 19, 19¹, then engage against the front face of the standards A, A¹, of the main frame and the inner clamped end of the case is so positioned that the space between the edge of the end and the clamping member 26 is in vertical alignment with the nailing guns of the machine, see drawing, Figure 7.

By the actuation of the machine by the operator a nailing operation takes place.

The operator then throws up the handle 27 and in this movement, which is in reverse to that just described, the clamping member 26 is retrieved to its non-operative position and at the same time the base and the case thereon then move outwardly on the work table D. This is effected through the radius links 32, 32¹, of the plates 23, 23¹, and 25, 25¹, and the clamping member 26 being disposed vertically at the inward travel position of the base, and when in the outward travel position the links 32, 32¹, turn down towards the rear of the machine with their connections to the control links 36, 36¹, by the plates 23, 23¹, cause the base to thus move outwards of the machine and then, by the back connections 37, 37¹, of the control links articulated to the fixtures 38, 38¹, on the standards A, A¹, stops or locks the base against any further movement by the pins 35, 35¹, over centering (see drawing, Figure 8). At the same time the guide pins 24, 24¹, run up the slots 19A, 19¹A, and the clamping member 26 is lifted free. The case F is then pulled to the outer end of the base by the machine operator for an endwise turning of the case for similar operation on the other end of its lid portion, or, if this has already been done, for discharge.

In all these movements the actions of the handle 27, the clamping member 26 and base movement are simultaneous, so that the operator can reach a standard where, in even and logical timings, a large number of liddings are executed, dependant only upon his own initiative.

Where the cleats F² are employed for stiffening the secured end joints, by a regulation of the clevis of the control links 36, 36¹, on the bearing plates so the space between the edge of the case end and the clamping member 26 may be adjusted so as to accommodate the cleat's width and position it across such end. The cleat F² is laid on the respective end to be nailed by the operator before the clamping member 26 is brought down by the handle 27, and then the above-mentioned combined clamping and inward movement of the base takes place. In such operation, the cleat F² is swept into position by the inner edge of the clamping bar 26 during its radial movement and held against the front sides of the arms 21, 21¹, of the back frame to be in true vertical alignment below the nailing guns C, C¹, C², C³, of the machine.

The spring 29 associated with the clamp pivot will maintain the handle 27 with the clamping member in its pressureised condition, and also hold the member at its free raised position.

Having now described my invention, what I claim is:

1. A lidding press for cases for use with a nailing machine having a work table and nailing guns disposed over the table, comprising a case mounting base adapted to be movably mounted on the table under the guns, a vertical back member attached to the base to engage a fixed part of the machine in the case-positioning movement of the base, a clamping member pivotally mounted and adjustably articulated upon the back member to accommodate case ends of varying depth to force an end of the lid down onto the case when the latter is positioned under the guns, and a compound linkage mechanism connected to the vertical back member and connected with the machine to move the back and base during an articulation of the clamping member, said mechanism having means so that the mechanism is caused to over-center and lock the back and base against further movement.

2. A lidding press for cases for use with a nailing machine having a work table and nailing guns disposed over the table, comprising a case mounting base adapted to be movably mounted on the table under the guns, a vertical back member attached to the base, a clamping member pivotally mounted and articulated to the base, a lever handle secured to the clamping member to be actuated to force the clamping member down with increasing pressure along a portion of a curving surface of the lid of a case on the work table to the end of the case positioned below the guns, and a compound linkage mechanism connected to the vertical back member connected with the machine to move the back and base during an articulation of the clamping member, said mechanism having means so that the mechanism is caused to over-center and lock the back and base against further movement.

3. A lidding press for cases for use with a nailing machine having a work table and nailing guns disposed over the table, comprising a case mounting base adapted to be movably mounted on the table, vertical extensible uprights connected to and projecting from the back of the base, a cross member connected to and extending between the uprights, vertical arms adjustably mounted on the cross member, each arm being curved throughout its length for guiding down end edges of the case lid slats in the movement of the base, a clamping member connected to be articulated to the uprights, a lever handle attached to the clamping member actuated to force the clamping member down on the end of the lid onto the case body in a position under the guns, and compound linkage mechanism connected to the clamping member and connected with the machine to move the base then over center to lock the base against further movement.

4. A lidding press for cases for use with a nailing machine having a work table and nailing guns disposed over the table, comprising a case mounting base adapted to be movably mounted on the table, vertical uprights connected to the projecting from the back of the base, extension members adjustably secured on the uprights, said extension members having angled slots therein extending inward from their rear edges near their tops, plates having pins projecting into and running in the slots with links pivoted at the lower ends of the extension members the other ends of the links being pivoted to the plates beyond the pins, a clamping member secured to the plates, a handle lever secured to the clamping member actuated to force the clamping member down with increasing pressure along a portion of a curving surface of the lid of a case on the base to the end of the case, and adjustable levers pivoted at their inner ends to the outer ends of the plates and their other ends connected to the machine, said levers being adapted to cause the base to move during actuation of the handle lever and then over center to be locked against further movement.

5. A lidding press for cases for use with a nailing machine having a main frame with nailing means at the front of the frame and a work table disposed at the front of the frame below the nailing means, comprising a base adapted movably mounted on the table and adapted to support a filled case on the base, a vertical back member attached to the base to engage the front of the main frame in an inward movement of the base, a clamping member connected to and articulated on the back member, a handle lever connected to the clamping member whereby the latter may be turned down by movement of the handle lever to be drawn with increasing pressure over a terminating end of a curving surface of a lid portion of the case to an end of the case, and mechanism connected with the handle lever and clamping member and the main frame so that the base may be moved inwardly simultaneously with the downward movement of the clamping member upon the case to bring such clamped end beneath the nailing means, said mechanism also causing the base to have outward movement in the raising of the handle lever and clamping member and then stop any further movement on the table in relation to the front of the machine.

References Cited in the file of this patent

UNITED STATES PATENTS

| | | |
|---|---|---|
| 966,699 | McAllister | Aug. 9, 1910 |
| 1,017,821 | Swickard | Feb. 20, 1912 |
| 1,473,643 | Robbins | Nov. 13, 1923 |
| 1,600,537 | Daven | Sept. 21, 1926 |
| 2,108,548 | Paxton | Feb. 15, 1938 |